Sept. 30, 1958        G. B. DERR        2,854,147
FISHING POLE RACK
Filed Nov. 18, 1955
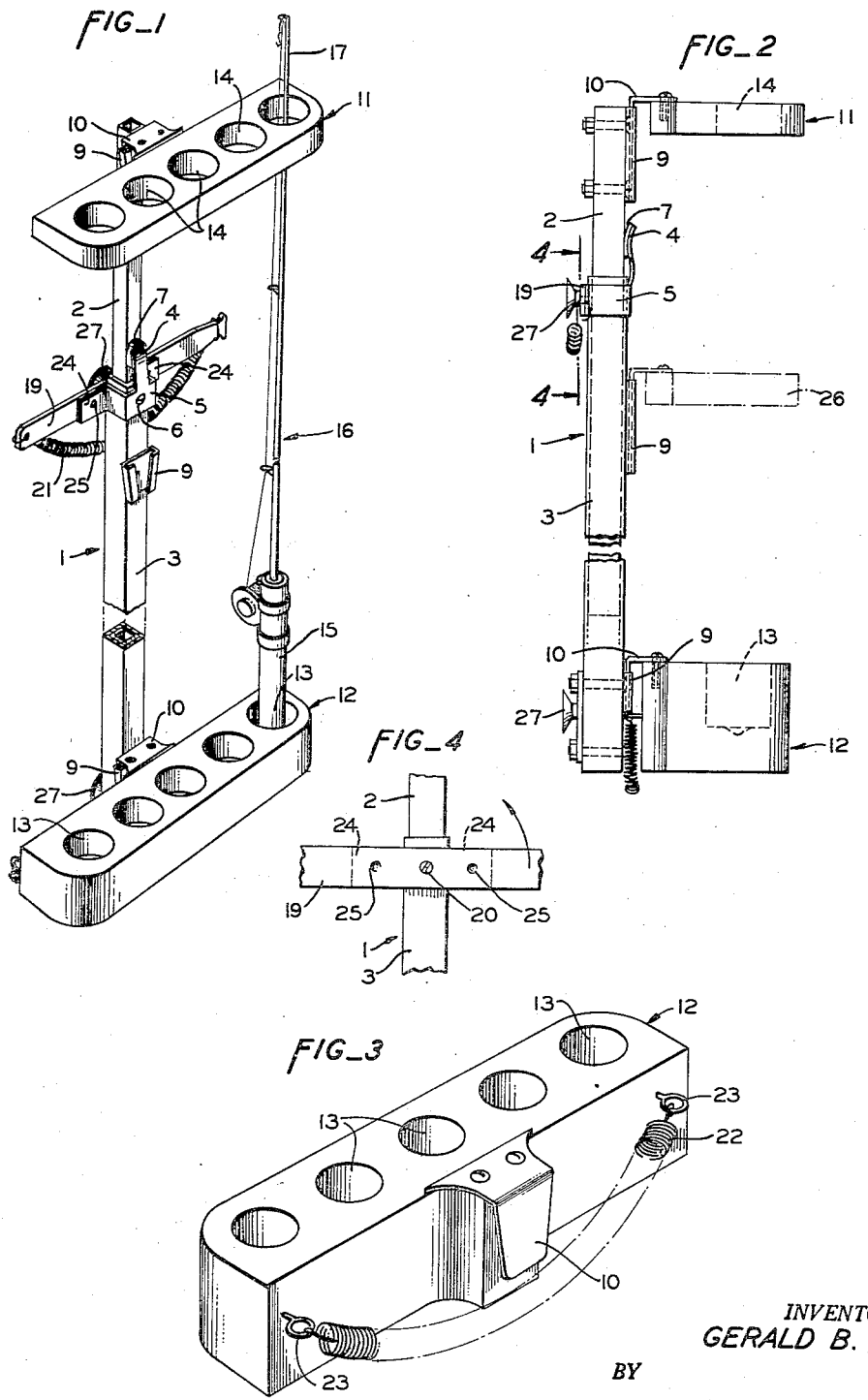
INVENTOR.
GERALD B. DERR
BY
Boyken, Mohler & Wood
ATTORNEYS

United States Patent Office 2,854,147
Patented Sept. 30, 1958

2,854,147

FISHING POLE RACK

Gerald B. Derr, Oakland, Calif.

Application November 18, 1955, Serial No. 547,627

2 Claims. (Cl. 211—60)

This invention relates to a portable rack for supporting fishing poles and the like.

Many people have found while they are out camping near a trout stream that there is no safe place to store their fishing poles when the same are not being used. It is most inconvenient to have to dismantle the pole and return it to its case every time it is not in action. Being relatively fragile, a fishing pole may be subject to numerous accidents if unprotected. If, for instance, it is propped against a tree or a tent, etc., the pole may be knocked or blown down and stepped on or run over.

In order to protect a fishing pole during the period when it is set up ready for use but not actually in use, this invention contemplates a portable rack for supporting the pole above the ground. The rack of this invention may also be used for display purposes in the home or commercially.

It is an object of this invention to provide a protective rack for supporting a fishing pole and the like.

Another object of this invention is the provision of a fishing pole rack which may be compactly stored or packed and it is easily and readily assembled for used.

Still another object of this invention is the provision of a rack for supporting fishing poles and the like which is adapted to be easily attached to most any convenient, permanent structure.

It is a further object of this invention to provide a fishing pole rack which may be simply and economically constructed.

A still further object of this invention is the provision of a fishing pole rack which is adaptable to support fishing rods of different types and sizes.

Other objects and advantages of this invention will become apparent from the following description taken in connection with the accompanying drawings in which:

Fig. 1 is a perspective view of the rack of this invention assembled and ready for use;

Fig. 2 is a side elevational view of the rack of Fig. 1;

Fig. 3 is an enlarged perspective view of the base support element of the rack of Fig. 1; and, Fig. 4 is a rear elevational view of the cross bar of the rack of Fig. 1, as seen generally from line 4—4 of Fig. 2.

In detail, the device of this invention comprises a vertically elongated rod member, generally designated 1, which may be composed of two hollow, tubular sections with the upper section 2 telescopically received in the lower section 3. At the juncture between sections 2 and 3 lower section 3 may be provided with friction means, such as finger 4, for engaging upper section 2 to resist accidental sliding of one section within the other. Finger 4 is shown in Fig. 1 as extending upwardly from a bracket 5 which is secured to the upper end of lower section 3 as by screw 6. Finger 4 may be made of a resilient material and provided with a softer pad 7 for yieldably engaging upper section 2 of rod 1 without marring the same.

At the upper end of section 2 and the lower end of section 3 rod 1 is provided with upwardly opening, V-shaped sockets 9, one of which may also be provided intermediate the ends of section 3. These sockets are for the purpose of receiving a downwardly directed projection 10 attached to each of a pair of fishing poles support elements 11, 12.

The lower or base support element 12 extends generally transversely of member 1, when attached as shown in Fig. 1, and is provided with a plurality of upwardly opening depressions 13.

These depressions are for the purpose of supporting the butt ends 15 of a plurality of fishing poles 16, or the like. Upper support element 11 is likewise provided with a plurality of similarly arranged holes 14 for receiving the upper end 17 of pole 16.

In this manner, when the device of this invention is assembled as shown in Fig. 1, a plurality of elongated objects such as fishing pole 16 may be appropriately supported therein and are prevented from accidental dislodgment. It is obvious that many different arrangements of sockets 13 and holes 14 may be made within the scope of this invention.

In order to support rod member 1 with elements 11, 12 thereon above the ground on a relatively permanent structure, such as a tree or a post, lower section 3 of said rod may be provided with a cross bar 19 extending horizontally from opposite sides thereof. Cross bar 19 may be secured to section 3 as by screw 20 on the side of said section opposite elements 11, 12. Flexible, resilient means, such as coil spring 21 has its ends releasably secured to the outer ends of bar 19 and is provided for encircling a tree, post or the like to support rod 1 thereagainst. In order to give added stability to the support of rod 1 lower support element 12 may also be provided with a similar spring 22, attached to opposite ends of said lower element as by screw eyes 23, for functioning in a manner similar to spring 21.

In order that the device of this invention can be readily packed in as small a space as possible, cross bar 19 may be rotatably mounted on lower section 3 by screw 20 (Fig. 4). In this case bracket 5 may be provided with a pair of outwardly extending wings 24 (Figs. 1, 4) which lie alongside bar 19 when the latter is horizontal. Detents 25 cooperating between wings 24 and cross bar 19 serve to releasably lock said cross bar in the horizontal position.

It will be noted that removal of elements 11, 12 and swinging of cross bar 19 to the generally vertical position paralleling rod 1 provides a compact and easily stored structure. Likewise the length of rod 1 can be shortened to the minimum by sliding section 2 into section 3.

The fact that rod 1 is adjustable as to length provides the device of this invention with great versatility in supporting elongated objects such as fishing pole 16 of varying length. For instance, the typical fly casting rod is substantially longer than many other fishing poles, such as a plug casting rod. To adequately support a fly casting rod upper section 2 should be extended sufficiently to bring upper support element 11 somewhere in the upper third of the rod length.

The socket 9 intermediate the ends of rod member 1 may be used to secure an auxiliary support element 26 (Fig. 2) for the purpose of supporting a number of shorter fishing poles in a manner similar to and in addition to the fly casting rods.

The side of rod member 1 opposite support elements 11, 12 may also be provided with suction cups 27 for supporting the rack of this invention against a smooth surface, such as a house trailer, garage wall or the like. The rack of this invention may in this manner be used in the home or commercially for the purpose of displaying fishing poles and the like when the same are not in use. Its greatest value, however, lies in its ability to support and protect the relatively fragile fishing pole 16 on camping trips and the like.

Although the invention has been described and illustrated in detail, the same is not to be taken as restrictive thereof as it is obvious that modifications could be made therein without departing from the spirit and scope of the invention.

I claim:

1. A portable rack for supporting fishing poles and the like comprising: a vertically elongated rod member, a base support element attached to the lower end of said rod member and having upwardly opening depressions therein adapted to receive the butt of a fishing pole, an upper support element attached to the upper end of said rod member and having holes therein adapted to receive the upper end of a fishing pole, and means for attaching said rod member to a relatively permanent structure, said rod member including an upper portion and a lower portion slidably mounted with respect to each other for increasing the length of said member, and friction means cooperating between said portions for releasably holding said member at the desired length.

2. A portable rack for supporting fishing poles and the like comprising, a vertically elongated rod member, a first horizontally extending element releasably secured to the lower end of said member and having upwardly opening depressions therein for receiving the butt ends of fishing poles and the like, a second horizontally extending element releasably secured to the upper end of said member and having apertures therein for receiving the upper ends of such poles, and flexible, resilient means attached to said member and adapted to embrace a post, tree, and the like for supporting said rack thereagainst, and means for so securing said elements to said member including a pair of upwardly opening sockets on said member and a downwardly directed projection on each of said elements adapted to be received in one of said sockets, said member including a pair of telescopically mounted portions, and an upwardly opening socket intermediate the ends of the lower of said portions for attaching a third element, similar to said second element, thereto.

References Cited in the file of this patent

UNITED STATES PATENTS

| | | |
|---|---|---|
| 422,410 | Hickok | Mar. 4, 1890 |
| 1,066,555 | Treiber | July 8, 1913 |
| 1,319,334 | Hartung | Oct. 21, 1919 |
| 1,994,225 | Lurcott | Mar. 12, 1935 |
| 2,558,911 | Penn | July 3, 1951 |
| 2,631,663 | Malkin | Mar. 17, 1953 |
| 2,676,710 | Williamson | Apr. 27, 1954 |